US012333679B2

(12) United States Patent
You (10) Patent No.: US 12,333,679 B2
(45) Date of Patent: Jun. 17, 2025

(54) IMAGE FUSION METHOD AND APPARATUS, STORAGE MEDIUM, AND TERMINAL (71) Applicant: SPREADTRUM COMMUNICATIONS (SHANGHAI) CO., LTD., Shanghai (CN)

(72) Inventor: Ruirong You, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 722 days.

(21) Appl. No.: 17/629,984

(22) PCT Filed: Apr. 17, 2020

(86) PCT No.: PCT/CN2020/085299
§ 371 (c)(1),
(2) Date: Jul. 5, 2022

(87) PCT Pub. No.: WO2021/017532
PCT Pub. Date: Feb. 4, 2021

(65) Prior Publication Data
US 2022/0327674 A1    Oct. 13, 2022

(30) Foreign Application Priority Data

Jul. 30, 2019 (CN) .......................... 201910693590.3

(51) Int. Cl.
G06T 7/00       (2017.01)
G06T 5/50       (2006.01)
(Continued)

(52) U.S. Cl.
CPC ............... G06T 5/50 (2013.01); G06T 5/80 (2024.01); G06T 7/571 (2017.01); G06T 7/73 (2017.01);
(Continued)

(58) Field of Classification Search
CPC .. G06T 5/50; G06T 5/80; G06T 7/571; G06T 7/73; G06T 2207/10148;
(Continued)

(56) References Cited

U.S. PATENT DOCUMENTS

2005/0089213 A1*  4/2005 Geng ................. G06T 7/33
                                              382/154
2009/0010507 A1*  1/2009 Geng ................. G06T 7/593
                                              382/128

(Continued)

FOREIGN PATENT DOCUMENTS

CN     103761721 A    4/2014
CN     105657237 A    6/2016
(Continued)

OTHER PUBLICATIONS

International Search Report for International Application No. PCT/CN2020/085299; Date of Mailing, Jul. 15, 2020.
(Continued)

Primary Examiner — Van D Huynh
(74) Attorney, Agent, or Firm — CANTOR COLBURN LLP (57) ABSTRACT A method for fusing images and apparatus, a storage medium, and a terminal are provided. The method for fusing images includes: obtaining a long-focal image to be fused and a wide-angle image to be fused; detecting feature points of the long-focal image and wide-angle image with a same scale, and matching the feature points to obtain matching feature point pairs; determining a fusion area based on position distributions of the matching feature point pairs; calculating a mapping matrix from the long-focal image to the wide-angle image at least based on coordinates of the matching feature point pairs in the long-focal image and the wide-angle image; and resampling the long-focal image based on the mapping matrix, and fusing the resampled (Continued)

long-focal image and the wide-angle image in the fusion area to obtain a fused image.

15 Claims, 5 Drawing Sheets

(51) Int. Cl.
  *G06T 5/80* (2024.01)
  *G06T 7/571* (2017.01)
  *G06T 7/73* (2017.01)

(52) U.S. Cl.
  CPC ............... *G06T 2207/10148* (2013.01); *G06T 2207/20221* (2013.01)

(58) Field of Classification Search
  CPC . G06T 2207/20221; G06T 2207/30168; G06F 18/22
  See application file for complete search history.

(56) References Cited

U.S. PATENT DOCUMENTS

| | | | | |
|---|---|---|---|---|
| 2012/0314036 | A1* | 12/2012 | Dahi ..................... | H04N 13/25 |
| | | | | 348/47 |
| 2018/0070018 | A1* | 3/2018 | Bian ..................... | H04N 23/698 |
| 2018/0096487 | A1* | 4/2018 | Nash ..................... | G06T 3/4038 |
| 2018/0359423 | A1* | 12/2018 | Shabtay ............... | H04N 23/958 |
| 2020/0193576 | A1* | 6/2020 | Yamada ................ | G02B 15/15 |
| 2021/0120184 | A1* | 4/2021 | Cohen .................. | H04N 23/45 |

FOREIGN PATENT DOCUMENTS

| | | |
|---|---|---|
| CN | 107369128 A | 11/2017 |
| CN | 1073691428 A | 11/2017 |
| CN | 109285136 A | 1/2019 |

OTHER PUBLICATIONS

CNIPA 1st OfficeAction for corresponding CN Application No. 201910693590.3, Issue Date, Sep. 2, 2022.

* cited by examiner

IMAGE FUSION METHOD AND APPARATUS, STORAGE MEDIUM, AND TERMINAL

CROSS-REFERENCE TO RELATED APPLICATIONS

This is the U.S. national stage of application No. PCT/CN2020/085299, filed on Apr. 17, 2020. Priority under 35 U.S.C. § 119(a) and 35 U.S.C. § 365(b) is claimed from Chinese Application No. 201910693590.3, filed Jul. 30, 2019, the disclosure of which is also incorporated herein by reference.

TECHNICAL FIELD

The present disclosure generally relates to image processing technology field, and more particularly, to a method for fusing images and apparatus, storage medium, and terminal.

BACKGROUND

With the development of smart phones, function of mobile phone cameras in mobile phones has become more and more important, and a single camera has gradually developed into dual cameras, triple cameras and even more cameras to achieve an effect comparable to that of a single-lens reflex camera. A small size of the camera and a large zoom range are two important parameters of a current mobile phone camera. Using an optical lens to achieve optical zoom, although a high-quality zoom image can be obtained, the size of the camera is increased inevitably and the cost is increased greatly. Using an ordinary single camera digital zoom, although the size of the camera can be guaranteed and the cost can be controlled, the image quality after zooming is not satisfactory.

As a result, a technology of realizing the optical zoom by multi-cameras simulation with different focal lengths came into being. Currently, more common combinations includes:

a) a wide-angle camera is combined with a long-focal camera to form a dual-focal zoom;

b) An ultra-wide-angle camera with a shorter focal length added on the basis of a) to achieve a three-focal zoom.

c) A camera with a longer focal length (which may be made into a foldable one, considering the size) added on the basis of a) to achieve the three-focal zoom.

d) Other multi-cameras combinations with different focal lengths.

Taking the combination a) as an example, due to different hardware parameters of different cameras (such as optical center, focal length, Field of view, (FOV for short), distortion and other internal parameters), and different installation arrangements in a module (such as arrangement of baseline, relative angle, position, etc.), when a wide-angle camera and a long-focal camera on a same module are shooting a same object, images with different FOVs, different relative positions, and different occlusions can be obtained inevitably.

Currently, there is a simple and low-cost zoom method. That is, simply switch cameras directly in different zoom ranges. For example, in a wide-angle focal length, an image captured by a wide-angle camera is digitally zoomed. While in a long-focal length, an image captured by a long-focal camera is digitally zoomed. Another advanced zoom method is to use an image processing technology to realize fusion of a wide-angle image and a long-focal image. In the wide-angle focal length, images of the wide-angle and a long-focal is fused, and image quality during zooming is improved, so that effect of continuous optical zoom can be achieved when switching to a long-focal length. The processing method takes into account a wide-angle large field of view and a high-detail resolution capability of a long-focal, and makes full use of advantages of hardware, especially when a high-end long-focal lens has a relatively large zoom factor, the image quality can be improved very obvious.

However, although the direct switching method of the wide-angle camera and the long-focal camera is uncomplicated in calculation, low in cost, and controllable in real time, the digital zoom is used in transition from the wide-angle to the long-focal instead of continuous optical zoom, which gives users an unnatural experience. And through the image fusion method, information of dual cameras is fully utilized to achieve the continuous zoom. However, due to different positions of the two cameras, there is a parallax between them, and distances (depth of field) of the captured scenes are different, and level of the parallaxes are different. Therefore, there is a need for a method to solve inevitable matching deviation and even error in the fusion process.

SUMMARY

The embodiment of the present disclosure provides a method for improving fusion effect of image fusion in different focal lengths.

In an embodiment of the present disclosure, a method for fusing images is provided, including: obtaining a long-focal image to be fused and a wide-angle image to be fused; detecting feature points of the long-focal image and wide-angle image with a same scale, and matching the feature points to obtain matching feature point pairs; determining a fusion area based on position distributions of the matching feature point pairs; calculating a mapping matrix from the long-focal image to the wide-angle image at least based on coordinates of the matching feature point pairs in the long-focal image and the wide-angle image; and resampling the long-focal image based on the mapping matrix, and fusing the resampled long-focal image and the wide-angle image in the fusion area to obtain a fused image.

In an embodiment of the present disclosure, an apparatus for fusing images is provided, including: an image obtaining circuitry, adapted to obtain a long-focal image to be fused and a wide-angle image to be fused; a feature point detecting circuitry, adapted to detect feature points of the long-focal image and wide-angle image with a same scale, and match the feature points to obtain matching feature point pairs; a fusion area determining circuitry, adapted to determine a fusion area based on position distributions of the matching feature point pairs; a mapping matrix calculating circuitry, adapted to calculate a mapping matrix from the long-focal image to the wide-angle image at least based on coordinates of the matching feature point pairs in the long-focal image and the wide-angle image; and a fusing circuitry, adapted to resample the long-focal image based on the mapping matrix, and fuse the resampled long-focal image and the wide-angle image in the fusion area to obtain a fused image.

In an embodiment of the present disclosure, a non-transitory storage medium is provided, the non-transitory storage medium storing one or more programs, the one or more programs comprising computer instructions, which, when executed by a processor, cause the processor to: obtain a long-focal image to be fused and a wide-angle image to be fused; detect feature points of the long-focal image and wide-angle image with a same scale, and match the feature points to obtain matching feature point pairs; determine a fusion area based on position distributions of the matching feature point pairs; calculate a mapping matrix from the long-focal image to the wide-angle image at least based on coordinates of the matching feature point pairs in the long-focal image and the wide-angle image; and resample the long-focal image based on the mapping matrix, and fuse the resampled long-focal image and the wide-angle image in the fusion area to obtain a fused image.

DETAILED DESCRIPTION

As mentioned in the background, although the direct switching method of the wide-angle camera and the long-focal camera is uncomplicated in calculation, low in cost, and controllable in real time, the digital zoom is used in transition from the wide-angle to the long-focal instead of continuous optical zoom, which gives users an unnatural experience. And through the image fusion method, information of dual cameras is fully utilized to achieve the continuous zoom. However, due to different positions of the two cameras, there is a parallax between them, and distances (depth of field) of the captured scenes are different, and level of the parallaxes are different. Therefore, there is a need for a method to solve inevitable matching deviation and even error in the fusion process.

According to embodiments of the present disclosure, by detecting the feature points in the long-focal image and the wide-angle image at the same scale, adaptively configuring the fusion area based on the distributions of the feature points and fusing the long-focal image and the wide-angle image in the fusion area, the problem of geometric dislocation can be solved effectively when the field of view is fused in the wide-angle segment.

In order to clarify the object, characteristic and advantages of embodiments of the present disclosure, the embodiments of present disclosure will be described clearly in detail in conjunction with accompanying drawings.

Figure 1:
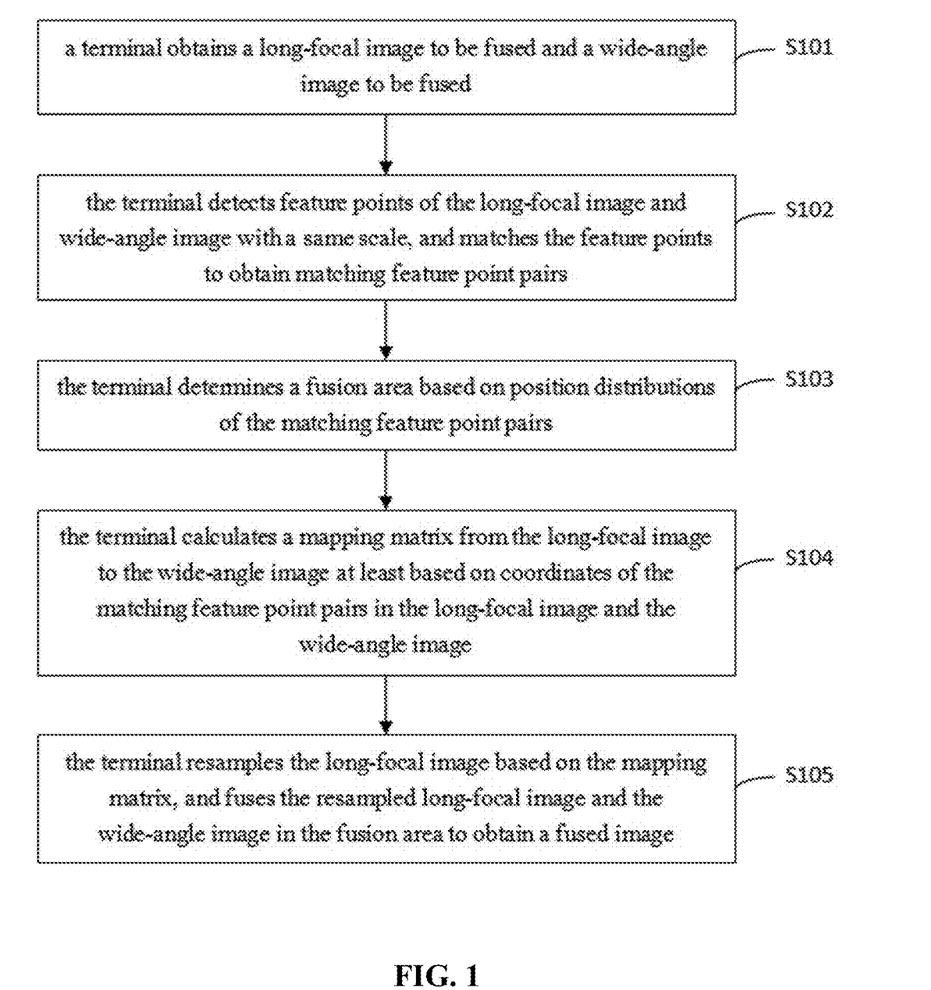
FIG. 1 schematically illustrates a flowchart of a method for fusing images according to an embodiment of the present disclosure.

FIG. 1 schematically illustrates a flowchart of a method for fusing images according to an embodiment of the present disclosure.

The method for fusing images as shown in FIG. 1 may be applied at a terminal side, such as a terminal device with a camera or a terminal device with image processing function, etc.

Specifically, the method for processing a resource conflict may include S101, S102, S103, S104 and S105.

In S101, a terminal obtains a long-focal image to be fused and a wide-angle image to be fused.

In S102, the terminal detects feature points of the long-focal image and wide-angle image with a same scale and matches the feature points to obtain matching feature point pairs.

In S103, the terminal determines a fusion area based on position distributions of the matching feature point pairs.

In S104, the terminal calculates a mapping matrix from the long-focal image to the wide-angle image at least based on coordinates of the matching feature point pairs in the long-focal image and the wide-angle image.

In S105, the terminal resamples the long-focal image based on the mapping matrix and fuses the resampled long-focal image and the wide-angle image in the fusion area to obtain a fused image.

It should be noted that the sequence numbers of the process in the embodiment do not mean to limiting on the execution order of the process.

The long-focal image in the embodiment may be an image captured by a long-focal lens, and the wide-angle image may be an image captured by a wide-angle lens. A zoom value (which may also be a zoom factor) adopted by the long-focal lens when shooting is greater than a zoom value adopted by the wide-angle lens when shooting. That is, the zoom value corresponding to the long-focal image is greater than the zoom value corresponding to the wide-angle image.

In a specific implementation of S101, the terminal obtains the long-focal image and the wide-angle image from a lens that captures the long-focal image or the wide-angle image directly; or the terminal obtains the long-focal image and the wide-angle image from an image storage device, such as an image memory.

Since the zoom values corresponding to the long-focal image and the wide-angle image are different, the matching of the feature points needs to be performed in a same scale, that is, the matching of the feature points needs to be performed in images corresponding to a same zoom value. Therefore, in a specific implementation of S102, the terminal transforms the long-focal image and the wide-angle image in a same scale and performs a feature point detection and matching on the long-focal image and wide-angle image at the same scale.

Specifically, the zoom factor corresponding to the wide-angle image is 1. The zoom factor corresponding to the long-focal image may be transformed in 1 to reduce an amount of calculation in the feature point detection.

It should be noted that the zoom factor corresponding to the wide-angle image may also be transformed in the zoom factor corresponding to the long-focal image; or, the zoom factor corresponding to the wide-angle image and the zoom factor corresponding to the long-focal image may also be jointly transformed in a same zoom factor, which does not mean to limiting in this embodiment of the present disclosure.

Specifically, the terminal may perform operations such as image distortion calibration and downsampling of the long-focal image, so that the zoom factor of the long-focal image is consistent with the zoom factor of the wide-angle image.

It can be understood that any other practicable algorithm or operation capable of transforming the zoom factor of the long-focal image may also be used, which does not mean to limiting in the embodiment of the present disclosure.

Specifically, existing feature point detection algorithms such as Harris, Features from Accelerated Segment Test (FAST), Scale-Invariant Feature Transform (SIFT), Speeded Up Robust Features (SURF), ORB, etc. may be used to detect feature points.

After S102, the terminal may obtain matching feature point pairs in the long-focal image and the wide-angle image, and the feature point pairs include feature points in the long-focal image and matching feature points in the wide-angle image. The matching feature point pairs have a same or a similar local feature, that is, the feature points in the long-focal image and the matching feature points in the wide-angle image includes corner points at the intersection of two edges or points whose gray value is significantly higher or lower than surrounding pixels.

Further, in S103, the terminal may determine a fusion area based on position distributions of the matching feature point pairs. Wherein, the fusion area can cover all feature points.

In a specific implementation, distribution of feature points varies from image to image. When the matching feature points are evenly distributed in an entire fusion area, a fusion edge dislocation problem is least likely to occur, and when there is a lack of feature point pairs distribution near the edge of the fusion area, the risk of geometric dislocation increases. Fusion in an area with feature point pairs may often correct the fusion edge dislocation problem caused by the depth of field to a certain extent. Therefore, the fusion area can be determined based on the distribution of feature points to effectively avoid the geometric dislocation problem of the fusion edge.

Figure 2:
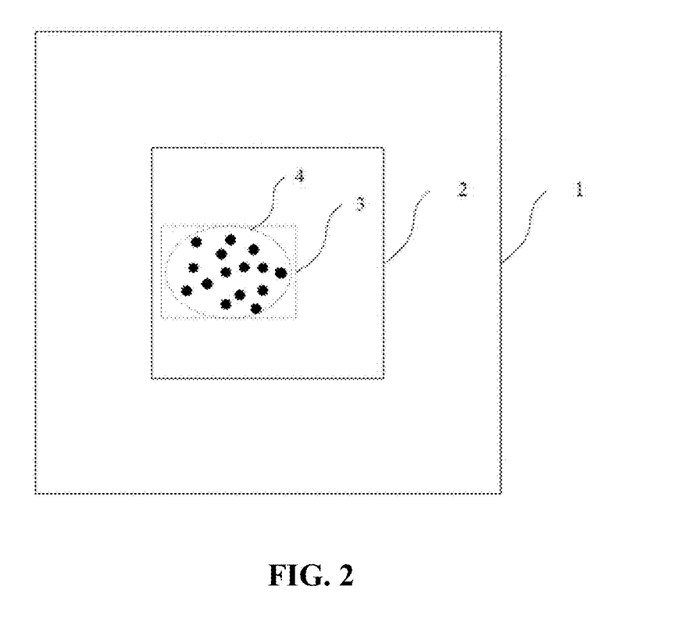
FIG. 2 schematically illustrates a specific application scenario diagram according to an embodiment of the present disclosure.

Referring to FIG. 2 together, numeral 1 in FIG. 2 represents a wide-angle image, numeral 2 represents a long-focal image at a same scale as the wide-angle image, and black pixels in FIG. 2 represent matching feature point pairs. The dotted line area indicated by numeral 3 represents a fusion area. The fusion area 3 can cover all feature point pairs.

Since the fusion operation needs to map a pixel value of one image to the other image, such as mapping the pixel value of the long-focal image to the wide-angle image, so that the pixel mapping relationship between the two images needs to be determined, thus, the mapping relationship between the positions of the pixels in the long-focal image and the wide-angle image.

In a specific implementation of S104, the terminal calculates a mapping matrix from the long-focal image to the wide-angle image at least based on coordinates of the matching feature point pairs in the long-focal image and the wide-angle image. Specifically, since the subsequent fusion operation is to map the pixels of the long-focal image in the fusion area to the wide-angle image, the mapping matrix may be calculated based on the coordinates of the matching feature points. The mapping matrix may represent coordinate correspondence between mapping the pixels of the long-focal image to the pixels of the wide-angle image.

In a specific implementation, the mapping matrix may be obtained by solving $k \times M \times (XT, YT, 1)T = (XW, YW, 1)T$, where $(XT, YT)$ and $(XW, YW)$ are corresponding feature point pairs on the long-focal image and the wide-angle image, respectively. M is a single-mapping matrix to be obtained, and k is a constant normalization factor. In theory, only four feature point pairs can be used to obtain the single-mapping matrix, but in practice, dozens or even more matching feature point pairs are often found, and the algorithm may obtain the globally optimal mapping matrix based on all matching feature point pairs.

Specifically, the mapping matrix may be a 3×3 single-mapping mapping matrix, which has more free space.

More specifically, through the mapping matrix, the wide-angle image and the long-focal image may be registered, that is, based on the wide-angle image, the long-focal image is subjected to a specific geometric transformation to obtain a new image whose position is aligned with the wide-angle image. Common image geometric transformations include: a translation transformation, a rigid body transformation, a similarity transformation, an affine transformation and a projection transformation. The projection transformation is a 3×3 matrix, also known as a single-mapping matrix, which is used to describe a mapping relationship from one plane to another and has more free space.

In a specific implementation of S105, before fusing the long-focal image and the wide-angle image, the zoom factor of the long-focal image needs to be adjusted to a zoom value to be fused, and when adjusting the long-focal image, the mapping relationship between the matching feature point pairs also needs to be considered. Thus, the long-focal image may be resampled using the mapping matrix.

According to embodiments of the present disclosure, by detecting the feature points in the long-focal image and the wide-angle image at the same scale, adaptively configuring the fusion area based on the distributions of the feature points and fusing the long-focal image and the wide-angle image in the fusion area, the problem of geometric dislocation can be solved effectively when the field of view is fused in the wide-angle segment.

In a non-limiting embodiment of the present disclosure, pixels of the fused image in the fusion area include pixels of the long-focal image in the fusion area, and pixels of the fused image in an image area outside the fusion area include pixels of the wide-angle image in the fusion area.

Figure 3:
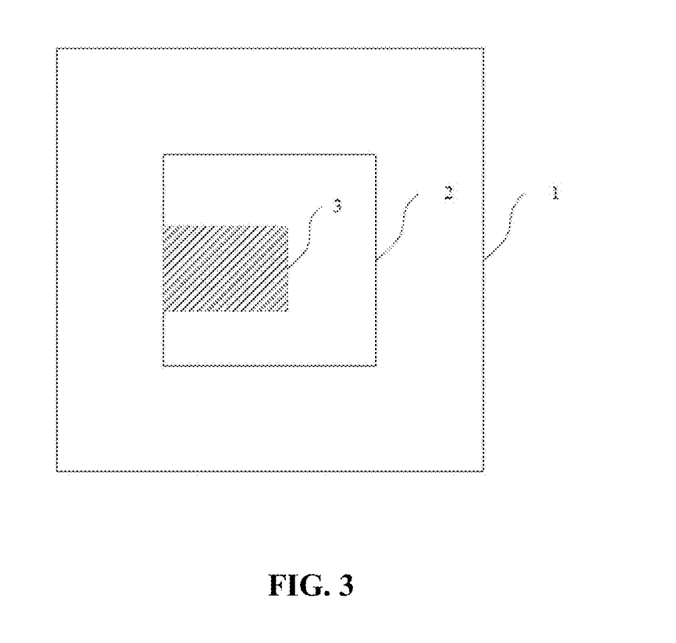
FIG. 3 schematically illustrates another specific application scenario diagram according to an embodiment of the present disclosure.

In a specific application scenario, referring to FIG. 3, FIG. 3 shows a fusion template, which is a binary grayscale image. Numeral 1 in FIG. 2 is a wide-angle image, numeral 2 is a long-focal image at a same scale as the wide-angle image. A grayscale value of the fusion template in the fusion area 3 is 1, and the grayscale value in the image area outside the fusion area (not marked, that is, the blank area in FIG. 3) is 0. When fusing the resampled long-focal image and the wide-angle image in the fusion area, the resampled long-focal image and the fusion template may be multiplied, and the pixels in the image area are filled with the pixels of the wide-angle image in the image area to obtain a fused image.

Figure 4:
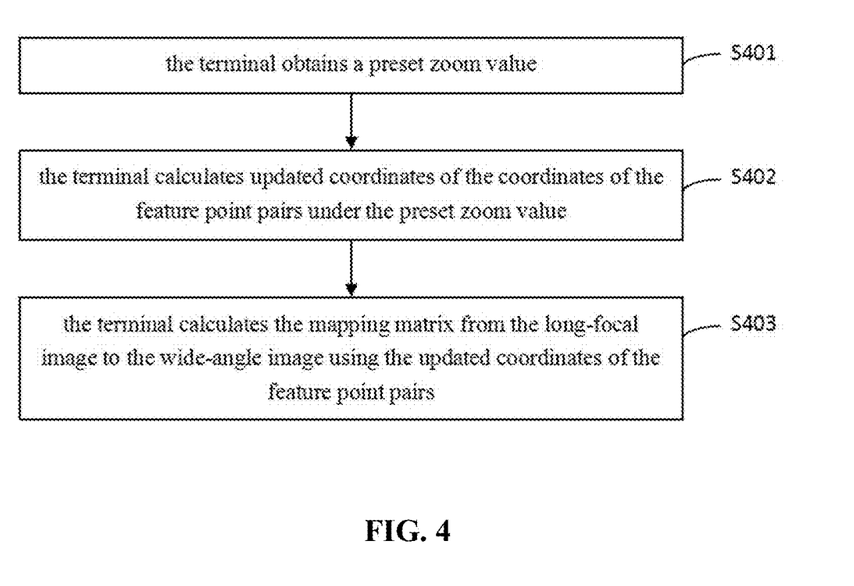
FIG. 4 schematically illustrates a flowchart of a specific implementation of S104 as shown in FIG. 1.

In a non-limiting embodiment of the present disclosure, referring to FIG. 4, S104 as shown in FIG. 1 may include: S401, S402 and S403.

In S401, the terminal obtains a preset zoom value.

In S402, the terminal calculates updated coordinates of the coordinates of the feature point pairs under the preset zoom value.

In S403, the terminal calculates the mapping matrix from the long-focal image to the wide-angle image using the updated coordinates of the feature point pairs.

In a specific implementation, the preset zoom value may be preset by a user. The preset zoom value may represent a zoom value corresponding to a fused image obtained by fusing the wide-angle image and the long-focal image.

As mentioned before, the mapping matrix is calculated from the coordinates of feature point pairs. Further, updated coordinates of the feature point pairs under the preset zoom value may be determined first, and then the mapping matrix may be calculated using the updated coordinates, so that the mapping matrix may reflect the zoom value corresponding to the fused image, which may be used in subsequent fusion operations to improve the convenience of fusion.

In an embodiment of the present disclosure, S105 as shown in FIG. 1 may include: the terminal multiplies the pixel matrix in the long-focal image and the mapping matrix to obtain a pixel matrix in the resampled long-focal image.

In a specific implementation, assuming that the long-focal image is T, the resampled long-focal image is T', and the mapping matrix is S, so that the resampled long-focal image T'=S×T.

In another specific embodiment of the present disclosure, S105 as shown in FIG. 1 may include: the terminal calculates an inverse matrix of the mapping matrix; multiplies a pixel coordinate matrix of the resampled long-focal image and the inverse matrix to obtain an updated coordinate matrix, the updated coordinate matrix represents pixel coordinates in the long-focal image corresponding to each pixel coordinate in a pixel coordinate matrix of the resampled long-focal image; and determines each pixel in the resampled long-focal image based on the updated coordinate matrix.

If the pixel matrix in the long-focal image is directly multiplied with the mapping matrix, the pixels in the long-focal image may be mapped to non-integer coordinates, which needs to be rounded to approximate, and two coordinate points in the original long-focal image are mapped to a same point, thus, in the resampled image there may be some coordinates in the resampled image that are not mapped, resulting in black noise point at specific position.

In the embodiment of the present disclosure, the inverse matrix S-1 of the mapping matrix S may be calculated first, and the pixel coordinate matrix of the resampled long-focal image T' is multiplied with the inverse matrix S-1, that is, the corresponding pixel point (x, y) may be obtained by inverse mapping each pixel (x', y') in the resampled image to the long-focal image. In this case, if the values of x and y are fractions, new pixel values may be calculated by a nearest neighbor interpolation, so as to ensure that there are no loopholes in the resampled image, and thus obtain a resampled image without leaks.

In a non-limiting embodiment of the present disclosure, the fusion area covers all feature points; and a shape of the fusion area is selected from: a circumscribed regular rectangle, a circumscribed rectangle, a circumscribed ellipse and a circumscribed polygon.

In a specific implementation, there may be various shapes of the fusion area, wherein, in a descending order of the area of the fusion area, the shapes of the fusion area are: circumscribed regular rectangle, circumscribed rectangle, circumscribed ellipse, and circumscribed polygon.

Specifically, the circumscribed polygon may be a shape formed by connecting matching feature points located at an outer edge.

Continuing to refer to FIG. 2 for details, both the fusion area 3 and the fusion area 4 can cover all the feature points, but the shape of the fusion area 3 is a circumscribed regular rectangle, and the shape of the fusion area 4 is a circumscribed ellipse. The area of fusion area 3 is larger than that of the fusion area 4.

In an actual fusion operation, fusion areas with different shapes may be selected according to actual needs.

In a non-limiting embodiment of the present disclosure, S105 as shown in FIG. 1 may include: the terminal selects a fusion area with a smallest area which can cover all feature points; and fuses the resampled long-focal image and the wide-angle image in the fusion area.

Since the smaller the area of the fusion area which can cover all the feature points, the better the fusion effect of the fused image, that is, the less the geometric dislocation of the fusion edge. Therefore, in the embodiment of the present disclosure, a fusion area with a smallest area which can cover all feature points may be directly selected for the fusion operation.

Specifically, a fusion area whose shape is a circumscribed polygon may be selected for the fusion operation.

Figure 5:
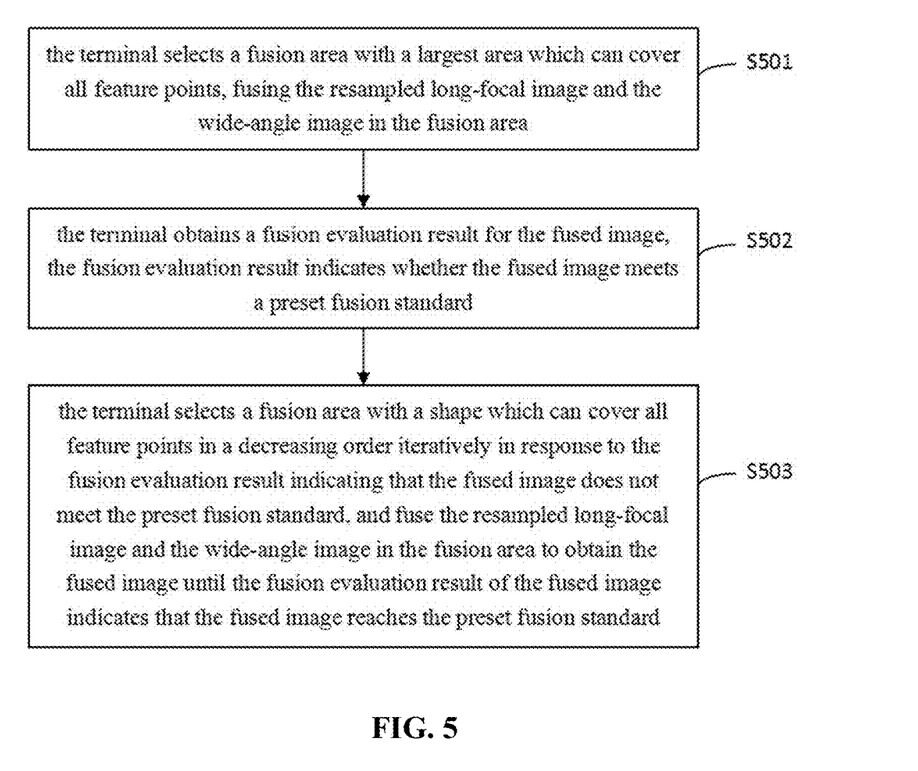
FIG. 5 schematically illustrates a flowchart of a specific implementation of S105 as shown in FIG. 1.

In a non-limiting embodiment of the present disclosure, referring to FIG. 5, S105 as shown in FIG. 1 may include: S501, S502 and S503.

In S501, the terminal selects a fusion area with a largest area which can cover all feature points, fusing the resampled long-focal image and the wide-angle image in the fusion area.

In S502, the terminal obtains a fusion evaluation result for the fused image, the fusion evaluation result indicates whether the fused image meets a preset fusion standard.

In S503, the terminal selects a fusion area with a shape which can cover all feature points in a decreasing order iteratively in response to the fusion evaluation result indicating that the fused image does not meet the preset fusion standard and fuse the resampled long-focal image and the wide-angle image in the fusion area to obtain the fused image until the fusion evaluation result of the fused image indicates that the fused image reaches the preset fusion standard.

In a specific implementation, the preset fusion standard may be measured by the geometric dislocation of the fusion edge of the resampled long-focal image and the wide-angle image. The fusion evaluation result may include a description or a quantized result of the geometric dislocation of the fusion edge between the resampled long-focal image and the wide-angle image.

In the embodiment of the present disclosure, the fusion operation may be performed first in a fusion area with a largest area, and then based on the fusion evaluation result, the terminal may determine whether to reduce the area of the fusion area, that is, the terminal may reselect a fusion area with a smaller area.

In a specific implementation of S502, the fusion evaluation result may be obtained from a third party.

In a specific implementation of S503, the shape of the fusion area may be selected in following order: circumscribed regular rectangle, circumscribed rectangle, circumscribed ellipse, and circumscribed polygon.

According to embodiments of the present disclosure, by a feedback mechanism of fusion effect of the fused image, that is, based on a current matching effect, whether to further reduce the area of the fusion area can be determined, thereby further avoiding matching deviation and improving fusion visual effect.

Figure 6:
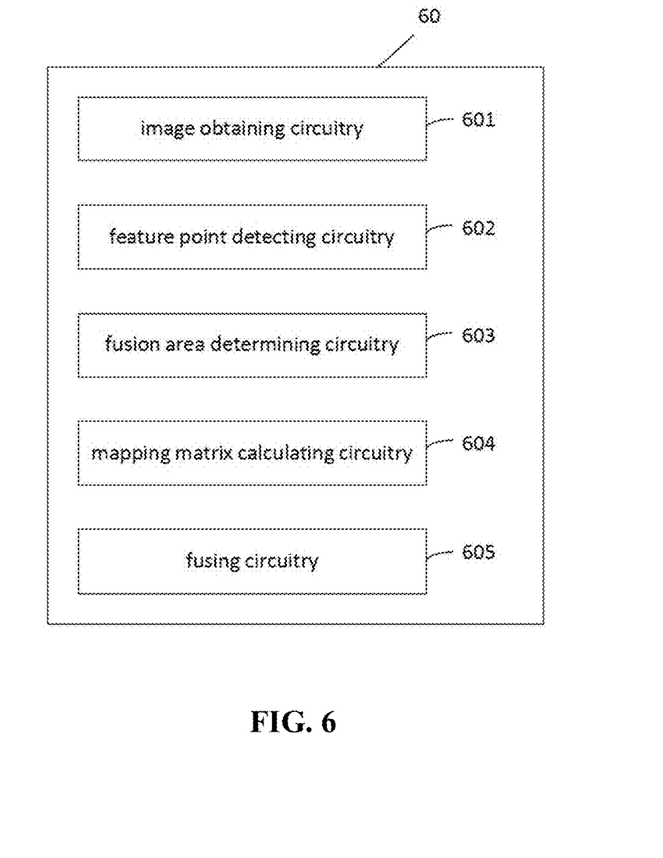
FIG. 6 schematically illustrates a structure diagram of an apparatus for fusing images according to an embodiment of the present disclosure.

Referring to FIG. 6, an apparatus 60 for fusing images is provided in an embodiment of the present disclosure. The apparatus 60 includes: an image obtaining circuitry 601, a feature point detecting circuitry 602, a fusion area determining circuitry 603, a mapping matrix calculating circuitry 604 and a fusing circuitry 605.

The image obtaining circuitry 601 is adapted to obtain a long-focal image to be fused and a wide-angle image to be fused.

The feature point detecting circuitry 602 is adapted to detect feature points of the long-focal image and wide-angle image with a same scale and match the feature points to obtain matching feature point pairs.

The fusion area determining circuitry 603 is adapted to determine a fusion area based on position distributions of the matching feature point pairs.

The mapping matrix calculating circuitry 604 is adapted to calculate a mapping matrix from the long-focal image to the wide-angle image at least based on coordinates of the matching feature point pairs in the long-focal image and the wide-angle image The fusing circuitry 605 is adapted to resample the long-focal image based on the mapping matrix and fuse the resampled long-focal image and the wide-angle image in the fusion area to obtain a fused image.

According to embodiments of the present disclosure, by detecting the feature points in the long-focal image and the wide-angle image at the same scale, adaptively setting the fusion area based on the distributions of the feature points and fusing the long-focal image and the wide-angle image in the fusion area, the problem of geometric dislocation can be solved effectively when the field of view is fused in the wide-angle segment.

For more details about the working principles and working modes of the apparatus 60 for fusing images, reference may be made to the relevant descriptions in FIG. 1 to FIG. 5, which is not repeated here.

In an embodiment of the present disclosure, a storage medium having computer instructions stored therein is provided, wherein once the computer instructions are executed, the method as shown in FIG. 1, FIG. 4 or FIG. 5 can be performed. In some embodiment, the storage medium may include a ROM, a RAM, a disk, an optical disk, or the like. The storage medium may also include a non-volatile memory or a non-transitory memory.

In an embodiment of the present disclosure, a terminal including a memory and a processor is provided, wherein the memory has computer instructions stored therein, and the method as shown in FIG. 1, FIG. 4 or FIG. 5 can be performed, once the processor executes the computer instructions. In some embodiment, the terminal includes, but not limited to, a terminal device such as a mobile phone, a computer, and a tablet computer.

Although the present disclosure is disclosed as above, the present disclosure is not limited to this. Those skilled in the art can make various changes and modifications without departing from the spirit and scope of the present disclosure. Therefore, the protection scope of the present disclosure should be subject to the scope defined by the claims.

What is claimed is:

1. A method for fusing images, comprising:
    obtaining a long-focal image to be fused and a wide-angle image to be fused;
    detecting feature points of the long-focal image and wide-angle image with a same scale, and matching the feature points to obtain matching feature point pairs;
    determining a fusion area based on position distributions of the matching feature point pairs;
    calculating a mapping matrix from the long-focal image to the wide-angle image at least based on coordinates of the matching feature point pairs in the long-focal image and the wide-angle image; and
    resampling the long-focal image based on the mapping matrix and fusing the resampled long-focal image and the wide-angle image in the fusion area to obtain a fused image.

2. The method according to claim 1, wherein pixels of the fused image in the fusion area comprise pixels of the long-focal image in the fusion area, and pixels of the fused image in an image area outside the fusion area comprise pixels of the wide-angle image in the fusion area.

3. The method according to claim 1, wherein said calculating the mapping matrix from the long-focal image to the wide-angle image at least based on coordinates of the matching feature point pairs in the long-focal image and the wide-angle image comprises:
    obtaining a preset zoom value;
    calculating updated coordinates of the coordinates of the feature point pairs under the preset zoom value; and
    calculating the mapping matrix from the long-focal image to the wide-angle image using the updated coordinates of the feature point pairs.

4. The method according to claim 1, wherein said resampling the long-focal image based on the mapping matrix comprises:
    calculating an inverse matrix of the mapping matrix;
    multiplying a pixel coordinate matrix of the resampled long-focal image and the inverse matrix to obtain an updated coordinate matrix, wherein the updated coordinate matrix represents pixel coordinates in the long-focal image corresponding to each pixel coordinate in a pixel coordinate matrix of the resampled long-focal image; and
    determining each pixel in the resampled long-focal image based on the updated coordinate matrix.

5. The method according to claim 1, wherein the fusion area covers all feature points;
    and a shape of the fusion area is selected from: a circumscribed regular rectangle, a circumscribed rectangle, a circumscribed ellipse and a circumscribed polygon.

6. The method according to claim 1, wherein said fusing the resampled long-focal image and the wide-angle image in the fusion area to obtain the fused image comprises:
    selecting a fusion area with a smallest area which can cover all feature points; and
    fusing the resampled long-focal image and the wide-angle image in the fusion area.

7. The method according to claim 1, wherein said fusing the resampled long-focal image and the wide-angle image in the fusion area to obtain the fused image comprises:
    selecting a fusion area with a largest area which can cover all feature points, fusing the resampled long-focal image and the wide-angle image in the fusion area;
    obtaining a fusion evaluation result for the fused image, wherein the fusion evaluation result indicates whether the fused image meets a preset fusion standard; and
    selecting a fusion area with a shape which can cover all feature points in a decreasing order iteratively in response to the fusion evaluation result indicating that the fused image does not meet the preset fusion standard and fusing the resampled long-focal image and the wide-angle image in the fusion area to obtain the fused image until the fusion evaluation result of the fused image indicates that the fused image reaches the preset fusion standard.

8. An apparatus for fusing images, comprising:
    an image obtaining circuitry, adapted to obtain a long-focal image to be fused and a wide-angle image to be fused;
    a feature point detecting circuitry, adapted to detect feature points of the long-focal image and wide-angle image with a same scale, and match the feature points to obtain matching feature point pairs;
    a fusion area determining circuitry, adapted to determine a fusion area based on position distributions of the matching feature point pairs;
    a mapping matrix calculating circuitry, adapted to calculate a mapping matrix from the long-focal image to the wide-angle image at least based on coordinates of the matching feature point pairs in the long-focal image and the wide-angle image; and
    a fusing circuitry, adapted to resample the long-focal image based on the mapping matrix, and fuse the resampled long-focal image and the wide-angle image in the fusion area to obtain a fused image.

9. A non-transitory storage medium storing one or more programs, the one or more programs comprising computer instructions, which, when executed by a processor, cause the processor to:
- obtain a long-focal image to be fused and a wide-angle image to be fused;
- detect feature points of the long-focal image and wide-angle image with a same scale, and match the feature points to obtain matching feature point pairs;
- determine a fusion area based on position distributions of the matching feature point pairs;
- calculate a mapping matrix from the long-focal image to the wide-angle image at least based on coordinates of the matching feature point pairs in the long-focal image and the wide- angle image; and
- resample the long-focal image based on the mapping matrix, and fuse the resampled long-focal image and the wide-angle image in the fusion area to obtain a fused image.

10. The non-transitory storage medium according to claim 9, wherein pixels of the fused image in the fusion area comprise pixels of the long-focal image in the fusion area, and pixels of the fused image in an image area outside the fusion area comprise pixels of the wide-angle image in the fusion area.

11. The non-transitory storage medium according to claim 9, wherein said calculating the mapping matrix from the long-focal image to the wide-angle image at least based on coordinates of the matching feature point pairs in the long-focal image and the wide-angle image comprises:
- obtaining a preset zoom value;
- calculating updated coordinates of the coordinates of the feature point pair pairs under the preset zoom value; and
- calculating the mapping matrix from the long-focal image to the wide-angle image using the updated coordinates of the feature point pairs.

12. The non-transitory storage medium according to claim 9, wherein said resampling the long-focal image based on the mapping matrix comprises:
- calculating an inverse matrix of the mapping matrix;
- multiplying a pixel coordinate matrix of the resampled long-focal image and the inverse matrix to obtain an updated coordinate matrix, wherein the updated coordinate matrix represents pixel coordinates in the long-focal image corresponding to each pixel coordinate in a pixel coordinate matrix of the resampled long-focal image; and
- determining each pixel in the resampled long-focal image based on the updated coordinate matrix.

13. The non-transitory storage medium according to claim 9, wherein the fusion area covers all feature points; and a shape of the fusion area is selected from: a circumscribed regular rectangle, a circumscribed rectangle, a circumscribed ellipse and a circumscribed polygon.

14. The non-transitory storage medium according to claim 9, wherein said fusing the resampled long-focal image and the wide-angle image in the fusion area to obtain the fused image comprises:
- selecting a fusion area with a smallest area which can cover all feature points; and
- fusing the resampled long-focal image and the wide-angle image in the fusion area.

15. The non-transitory storage medium according to claim 9, wherein said fusing the resampled long-focal image and the wide-angle image in the fusion area to obtain the fused image comprises:
- selecting a fusion area with a largest area which can cover all feature points, fusing the resampled long-focal image and the wide-angle image in the fusion area;
- obtaining a fusion evaluation result for the fused image, wherein the fusion evaluation result indicates whether the fused image meets a preset fusion standard; and
- selecting a fusion area with a shape which can cover all feature points in a decreasing order iteratively in response to the fusion evaluation result indicating that the fused image does not meet the preset fusion standard and fusing the resampled long-focal image and the wide-angle image in the fusion area to obtain the fused image until the fusion evaluation result of the fused image indicates that the fused image reaches the preset fusion standard.

* * * * *